(12) United States Patent
Fujii et al.

(10) Patent No.: US 12,492,917 B2
(45) Date of Patent: Dec. 9, 2025

(54) ROTATION DETECTION DEVICE, ROTATION DETECTION METHOD, AND ROTATION DETECTION PROGRAM

(71) Applicant: MINEBEA MITSUMI Inc., Nagano (JP)

(72) Inventors: Jumpei Fujii, Nagano (JP); Juichi Uno, Nagano (JP); Haruka Miyaji, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 223 days.

(21) Appl. No.: 18/566,798

(22) PCT Filed: Jun. 3, 2022

(86) PCT No.: PCT/JP2022/022595
§ 371 (c)(1),
(2) Date: Dec. 4, 2023

(87) PCT Pub. No.: WO2022/259969
PCT Pub. Date: Dec. 15, 2022

(65) Prior Publication Data
US 2024/0369381 A1    Nov. 7, 2024

(30) Foreign Application Priority Data
Jun. 7, 2021    (JP) ................. 2021-094911

(51) Int. Cl.
*G01D 5/165* (2006.01)
*G01B 7/00* (2006.01)

(52) U.S. Cl.
CPC ............ *G01D 5/165* (2013.01); *G01B 7/003* (2013.01); *G01D 2205/26* (2021.05)

(58) Field of Classification Search
None
See application file for complete search history.

(56) References Cited

U.S. PATENT DOCUMENTS

| 4,203,074 A | 5/1980 | Gass |
| 11,639,861 B2 * | 5/2023 | Fujita ................. B62D 15/0235 180/443 |
| 2024/0247927 A1 * | 7/2024 | Fujii ....................... G01B 7/30 |

FOREIGN PATENT DOCUMENTS

| JP | S53-012382 U | 2/1978 |
| JP | S53-104263 | 9/1978 |

(Continued)

OTHER PUBLICATIONS

International Search Report for PCT/JP2022/022595 mailed on Aug. 9, 2022.

*Primary Examiner* — Eman A Alkafawi
*Assistant Examiner* — Suresh K Rajaputra
(74) *Attorney, Agent, or Firm* — IPUSA, PLLC (57) ABSTRACT

A rotation detection device includes: a first comparator configured to generate a first digital signal that indicates a magnitude relationship between a first voltage, which is output from a potentiometer in accordance with an amount of rotation of a rotating body, and a threshold voltage; a second comparator configured to generate a second digital signal that indicates a magnitude relationship between a second voltage, which is obtained by dividing the first voltage, and the threshold voltage; and a controller configured to detect a direction of rotation and a number of complete turns of the rotating body based on transition edges of the first digital signal and transition edges of the second digital signal. By this means, even when the rotating body rotates while not being driven, it is possible to detect the number of complete turns of the rotating body.

7 Claims, 5 Drawing Sheets

(56) References Cited

FOREIGN PATENT DOCUMENTS

| JP | H05-158541 | 6/1993 |
| JP | 2000-205258 | 7/2000 |
| JP | 2017-207382 | 11/2017 |

* cited by examiner

ROTATION DETECTION DEVICE, ROTATION DETECTION METHOD, AND ROTATION DETECTION PROGRAM

TECHNICAL FIELD

The present invention relates to a rotation detection device, a rotation detection method, and a rotation detection program.

BACKGROUND ART

To detect the position of a continuously rotating shaft by using a potentiometer, a method of eliminating undetectable positions by providing two potentiometers is known (see Patent Document 1). Also, a method of controlling the position of a rotating body is known, whereby a magnetic bearing control device controls the position of the rotating body by resetting the count value every time a sensor detects one rotation of the rotating body, and by detecting the number of complete turns of the rotating body based on the count value immediately before the reset (see Patent Document 2).

CITATION LIST

Patent Document

Patent Document 1: Unexamined Japanese Patent Application Publication No. H05-158541
Patent Document 2: Unexamined Japanese Patent Application Publication No. 2000-205258

SUMMARY OF THE INVENTION

Problem to be Solved by the Invention

The waveform of a voltage that is output from a potentiometer shows periodic changes; such changes have varying characteristics depending on the direction of rotation of the rotating body. Therefore, for example, the number of complete turns of a rotating body is detected based on timings at which the voltage waveform output from the potentiometer shows periodic changes, and the direction in which the rotating body rotates. Normally, the driver that drives the rotating body to rotate identifies the direction of rotation of the rotating body. However, if the rotating body is not driven to rotate and rotates in response to an external force, the direction of rotation varies depending on the way the external force is received, which makes it difficult to detect the number of complete turns of the rotating body.

The technique disclosed herein has been made in view of the foregoing, and aims to detect the number of complete turns of a rotating body that rotates when it is not driven to rotate.

Means for Solving the Problem

According to one embodiment of the present disclosure, a rotation detection device includes: a first comparator configured to generate a first digital signal that indicates a magnitude relationship between a first voltage, which is output from a potentiometer in accordance with an amount of rotation of a rotating body, and a threshold voltage; a second comparator configured to generate a second digital signal that indicates a magnitude relationship between a second voltage, which is obtained by dividing the first voltage, and the threshold voltage; and a controller configured to detect a direction of rotation and a number of complete turns of the rotating body based on transition edges of the first digital signal and transition edges of the second digital signal.

Advantageous Effects of the Invention

It is therefore possible to detect the number of complete turns of a rotating body that rotates when it is not driven to rotate.

EMBODIMENTS FOR CARRYING OUT THE INVENTION

Hereinafter, an embodiment for carrying out the invention will be described with reference to the accompanying drawings. In the following description, signal wires in which information such as signals is transmitted will be assigned the same reference codes as signal names, and voltage wires or power supply wires will be assigned the same reference codes as voltage names or power supply names.

Figure 1:
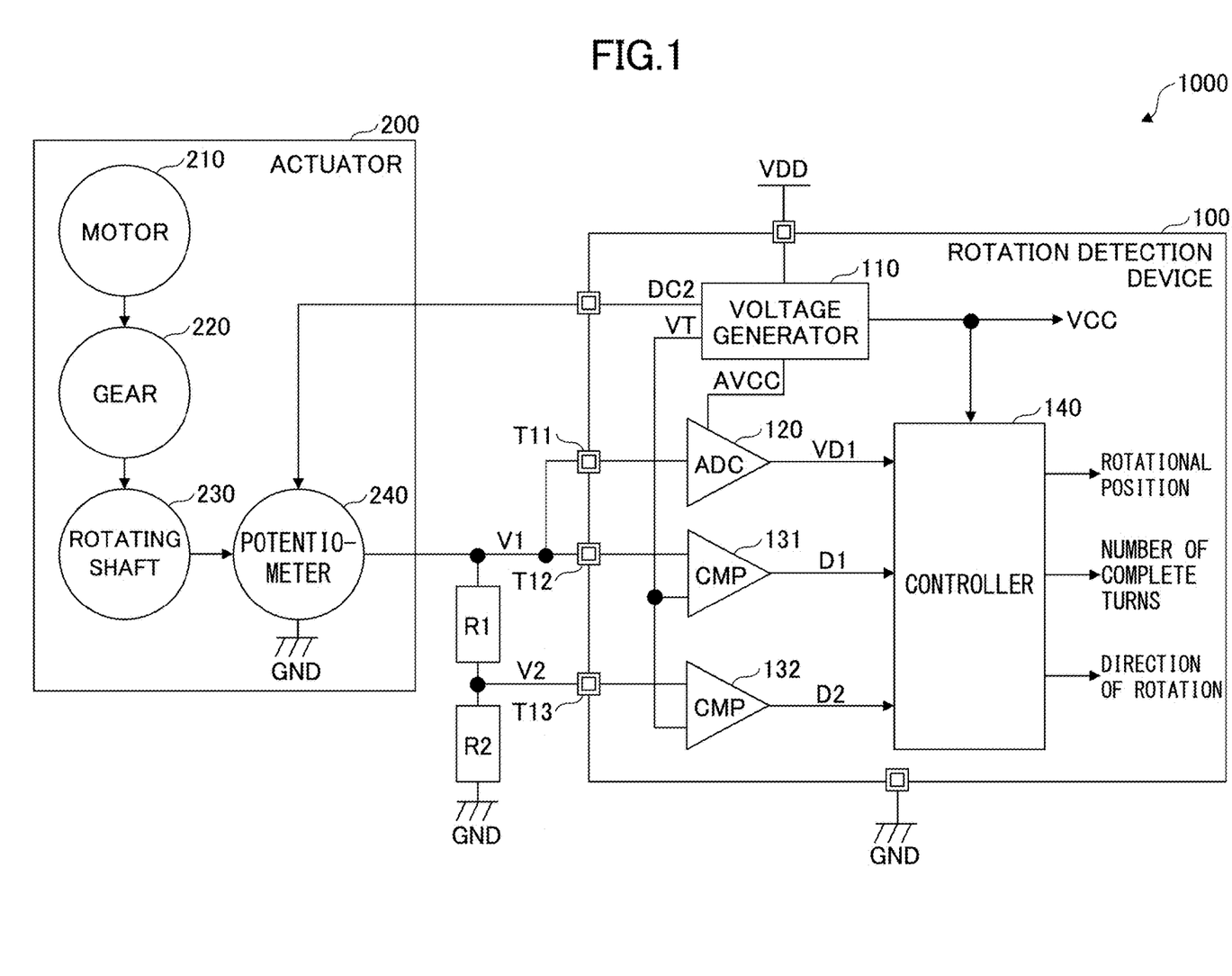
FIG. 1 is a block diagram that illustrates an example of a system including a rotation detection device according to a first embodiment.

FIG. 1 is a block diagram that illustrates an example of a system including a rotation detection device according to a first embodiment. The system 1000 shown in FIG. 1 includes a rotation detection device 100, an actuator 200, and resistors R1 and R2. The system 1000 is, for example, an air conditioning system for automobiles, such as a heating, ventilation, and air conditioning (HVAC) system, but this is by no means a limitation.

The rotation detection device 100 includes a voltage generator 110, an analog-to-digital converter (ADC) 120, comparators (CMP) 131 and 132, and a controller 140. The actuator 200 includes a motor 210, a gear (reduction gear) 220, a rotating shaft (rotor) 230, and a potentiometer 240. The rotating shaft 230 is an example of a rotating body. In the following description, the analog-to-digital converter 120 will also be referred to as "AD converter 120."

The motor 210 is, for example, a stepping motor. The motor 210 rotates forward or in the reverse direction, in accordance with pulse signals from a driver (not shown). The gear 220 is connected between the motor 210 and the rotating shaft 230, and transmits decelerated rotation of the motor 210 to the rotating shaft 230. The rotating shaft 230 is connected to, for example, a vane that adjusts airflow, a valve that adjusts the rate of airflow, and so forth.

The potentiometer 240 is positioned near the rotating shaft 230. The potentiometer 240 functions as a variable resistor whose resistance value changes depending on the rotational position (that is, the amount of rotation) of the rotating shaft 230, divides a DC voltage DC2, and outputs a voltage V1. The resistors R1 and R2 are connected in series between a voltage wire V1 and a ground wire GND. At a connecting node (V2) of the resistors R1 and R2, the resistors R1 and R2 generate a voltage V2, which is obtained by division of voltage in accordance with the resistance values.

For example, based on an external power supply voltage VDD received from outside, the voltage generator 110 generates a DC voltage DC2 having a lower voltage value than the external power supply voltage VDD, a threshold voltage VT, a power supply voltage VCC, and a power supply voltage AVCC for analog circuits. The threshold voltage VT is set lower than the maximum voltage (for example, DC2) that is output from the potentiometer 240. Note that the threshold voltage VT may be supplied from outside the rotation detection device 100. In this case, the voltage generator 110 does not have the function to generate the threshold voltage VT. The power supply voltage VCC is used to supply power to digital circuits such as the controller 140 and comparators 131 and 132 provided in the rotation detection device 100. The power supply voltage AVCC is used to supply power to the AD converter 120 and the like.

The AD converter 120 converts a voltage V1, which is received via an external terminal T11, into a digital value, and outputs a digital voltage value VD1. The comparator 131 compares the voltage V1, which is received via an external terminal T12, and the threshold voltage VT, and outputs a binary digital signal D1 that indicates the magnitude relationship between the voltage V1 and the threshold voltage VT. The comparator 132 compares a voltage V2, which is received via an external terminal T13, and the threshold voltage VT, and outputs a binary digital signal D2 that indicates the magnitude relationship between the voltage V2 and the threshold voltage VT.

The voltage V1 input to the AD converter 120 and the voltage V1 input to the comparator 131 are supplied to the rotation detection device 100 via respective external terminals T11 and T12. By this means, the voltage V1 input to the AD converter 120 and the voltage V1 input to the comparator 131 can be prevented from interfering with each other. As a result of this, it is possible to prevent the accuracy of detection by the AD converter 120 and the comparator 131 from decreasing.

Figure 3:
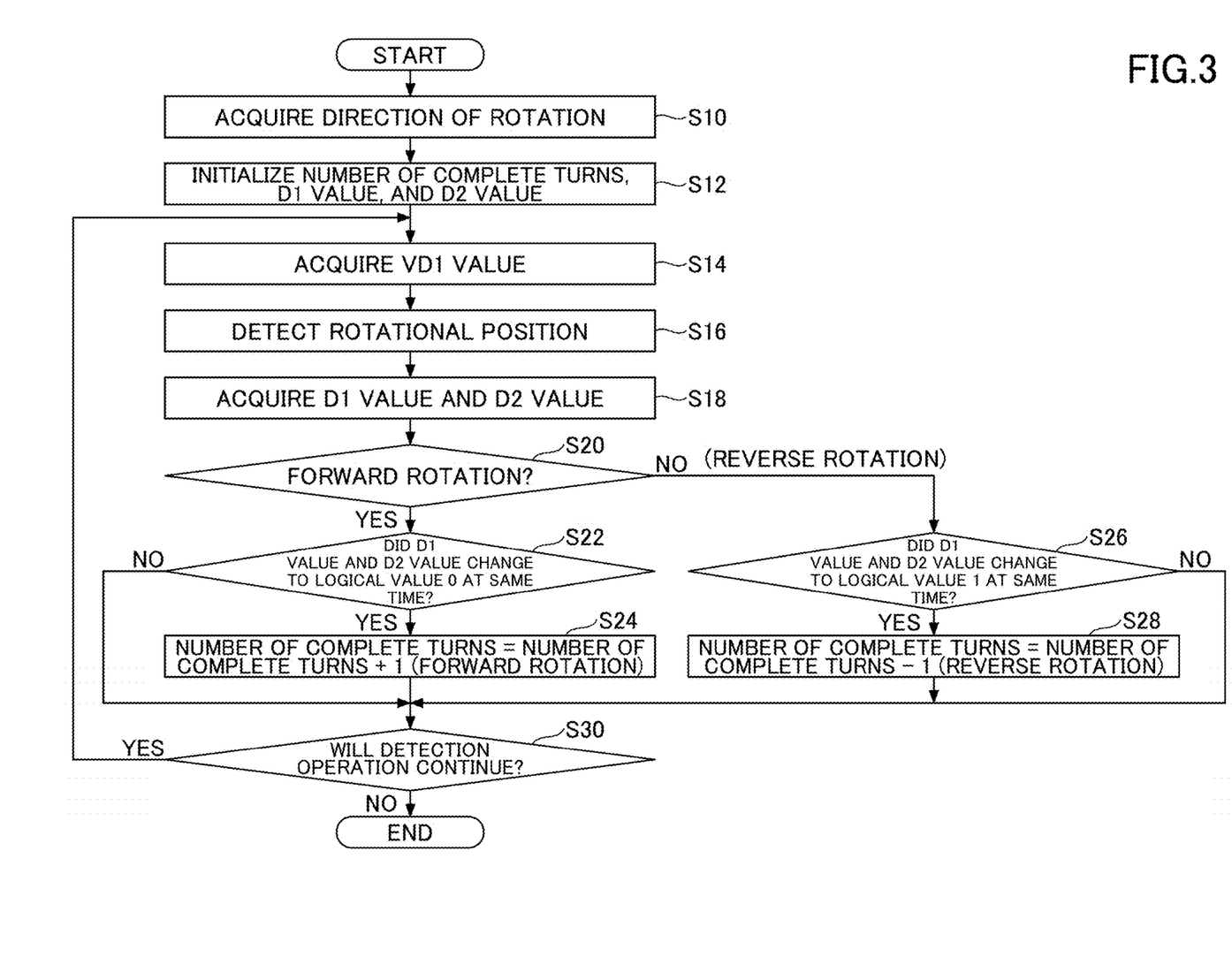
FIG. 3 is a flowchart that illustrates an example of the operation of the rotation detection device when the motor of FIG. 1 is being driven.
Figure 4:
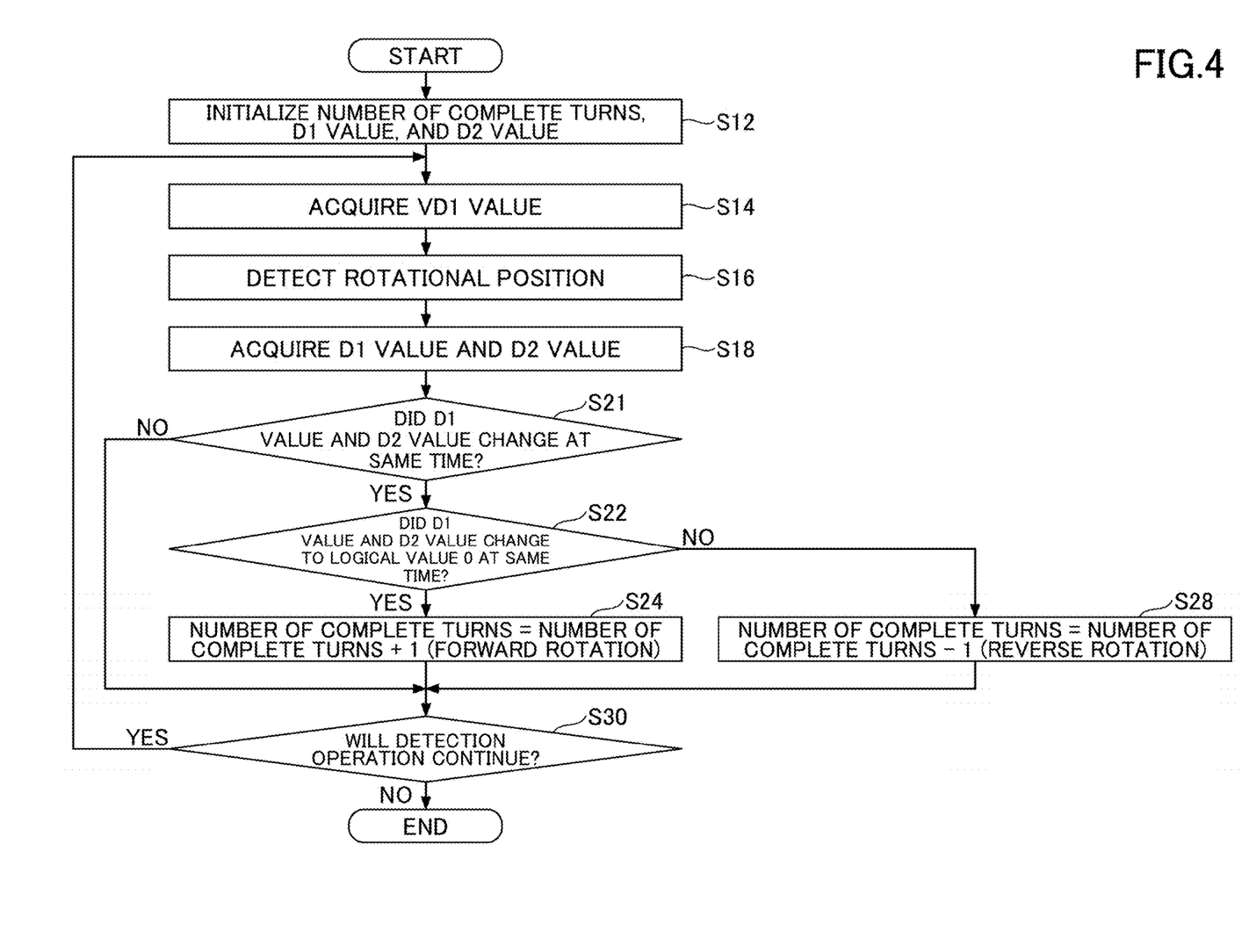
FIG. 4 is a flowchart that illustrates an example of the operation of the rotation detection device of FIG. 1 when the motor is not being driven.

The controller 140 detects the rotational position (absolute position) of the rotating shaft 230 based on the digital voltage value VD1 from the AD converter 120. Also, the controller 140 detects the direction of rotation and the number of complete turns of the rotating shaft 230 based on digital signals D1 and D2 from the comparators 131 and 132. Examples of the operation of the controller 140 are shown in FIG. 3 and FIG. 4.

Figure 2:
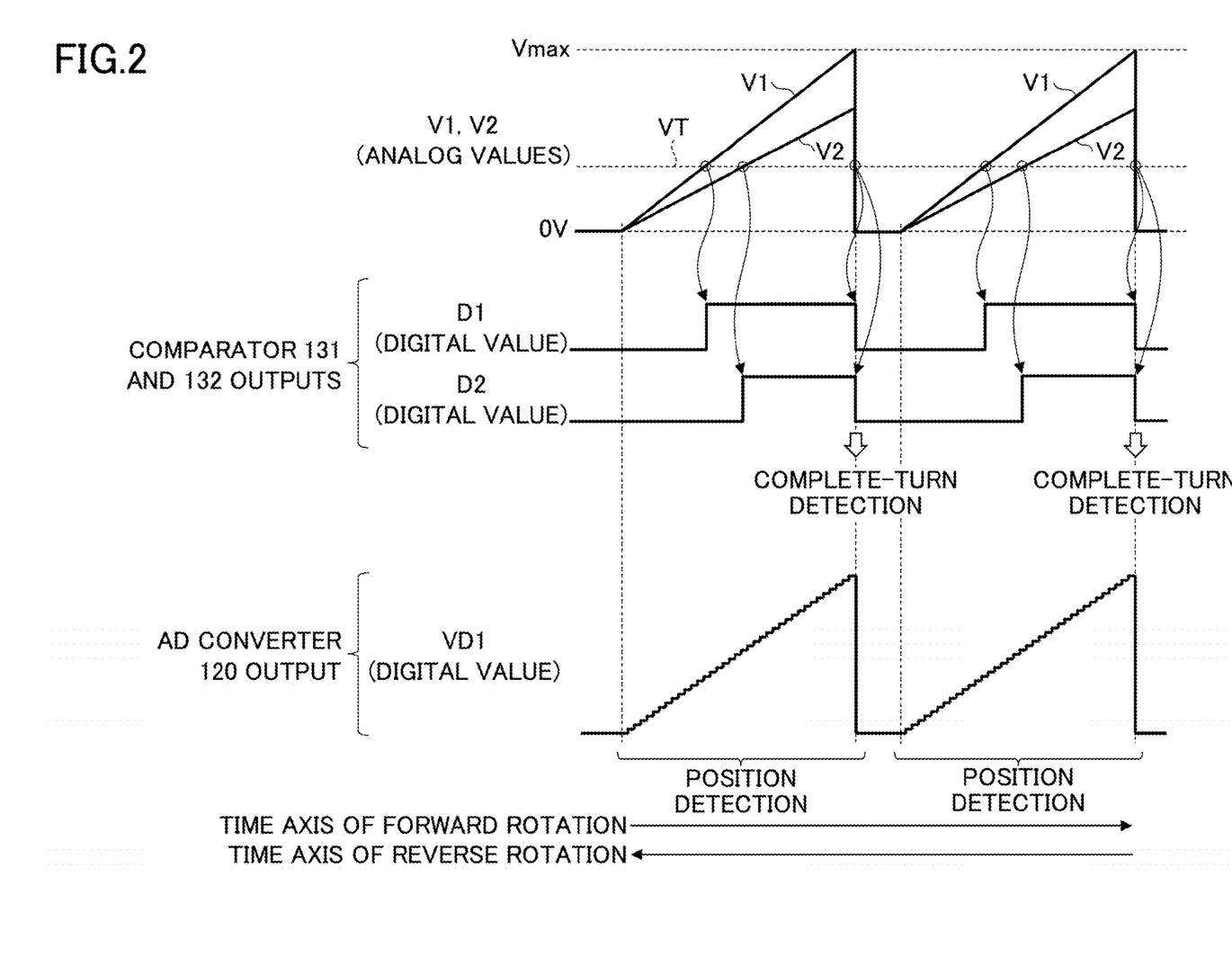
FIG. 2 is a timing diagram that illustrates an example of the operation of the rotation detection device of FIG. 1.

FIG. 2 is a timing diagram that illustrates an example of the operation of the rotation detection device 100 of FIG. 1. For example, the waveforms shown in FIG. 2 show a case in which the rotating shaft 230 of FIG. 1 rotates forward. When the rotating shaft 230 rotates in the reverse direction, the waveforms become ones in which the left and right are reversed on the time axis. In the following description, the operation when the rotating shaft 230 rotates forward will be mainly described.

When the rotating shaft 230 is in a predetermined range of rotation angles (initial position), the potentiometer 240 outputs a voltage V1 of 0 V. When the rotating shaft 230 rotates and moves away from its initial position, the potentiometer 240 outputs voltages V1 (the maximum value being Vmax) in accordance with changes of the rotation angle until the rotation angle peaks. The potentiometer 240 outputs a voltage V1 of 0 V when the rotation angle of the rotating shaft 230 returns from the maximum position to the initial position.

In this way, when the rotating shaft 230 rotates, the potentiometer 240 gradually increases the voltage V1 from 0 V to Vmax, then sets it to 0 V, and maintains the voltage V1 at 0 V while the rotating shaft 230 is in the initial position. By this means, the potentiometer 240 outputs voltages V1 that form a triangular wave. The voltage V2, which is output from the connecting node of the resistors R1 and R2, increases as the voltage V1 increases, has a value that is smaller than the voltage V1 by a predetermined ratio, and has a triangular wave shape.

The comparator 131 outputs a low-level digital signal D1 (logical value 0) when the voltage V1 output from the potentiometer 240 is lower than the threshold voltage VT. The comparator 131 outputs a high-level digital signal D1 (logical value 1) when the voltage V1 is greater than or equal to the threshold voltage VT. The comparator 132 outputs a low-level digital signal D2 (logical value 0) when the voltage V2 at the connecting node of the resistors R1 and R2 is lower than the threshold voltage VT. The comparator 132 outputs a high-level digital signal D2 (logical value 1) when the voltage V2 at the connecting node of the resistors R1 and R2 is greater than or equal to the threshold voltage VT.

When the rotating shaft 230 rotates forward, the rate of increase (slope) of the voltage V2 is less than the rate of increase of the voltage V1. Therefore, the rising edge of the digital signal D2 lags behind the rising edge of the digital signal D1. That is, the falling edges of the digital signals D2 and D1 have a gap in time. On the other hand, when the rotating shaft 230 rotates in the reverse direction, the rate of decrease (slope) of the voltage V2 is less than the rate of decrease of the voltage V1. Also, the maximum voltage of the voltage V2 is lower than the maximum value Vmax of the voltage V1. Therefore, the falling edge of the digital signal D2 precedes the falling edge of the digital signal D1.

The AD converter 120 converts the voltages V1 output from the potentiometer 240 into digital voltage values VD1. Note that the step-like waveform of digital voltage values VD1 shown in FIG. 2 has a small number of steps for ease of understanding; however, the number of steps in the actual waveform is determined depending on the resolution of the AD converter 120.

Regardless of whether the driver is driving the motor 210 or not, the controller 140 of FIG. 1 detects one rotation (complete turn) of the rotating shaft 230 when the logical values of the digital signals D1 and D2 output from the comparators 131 and 132 change at the same time. The controller 140 detects one forward rotation (complete turn) of the rotating shaft 230 when the logical values of the digital signals D1 and D2 change to the logical value 0 at the same time. Also, the controller 140 detects one rotation (complete turn) of the rotating shaft 230 in the reverse direction when the logical values of the digital signals D1 and D2 change to the logical value 1 at the same time.

Here, since the voltages V1 and V2 rise at different speeds, the phases of the rising edges of the digital signals D1 and D2 shift from each other during forward rotation, and the phases of the falling edges of the digital signals D1 and D2 shift from each other during reverse rotation. Therefore, when the logical values of the digital signals D1 and D2 change at the same time, whether a complete turn has been made in forward rotation or reverse rotation can be easily determined by detecting the direction of change of the logical values (that is, by detecting whether they are rising edges or falling edges). Examples of complete-turn detection control by the controller 140 will be described with reference to FIG. 3 and FIG. 4.

Note that the controller 140 determines whether the driver is driving the motor 210 based on information received from the driver. When the controller 140 receives no information from the driver as to whether or not the driver is driving the motor 210, that is, when the driving of the motor 210 is stopped and the rotating shaft 230 is rotated by an external force, the controller 140 may detect the direction of rotation of the rotating shaft 230 based on the gap between the timings of the transition edges of the digital signals D1 and D2.

To be more specific, when the controller 140 detects a rising edge of the digital signal D2 after a rising edge of the digital signal D1, the controller 140 may detect that the rotating shaft 230 is rotating forward. When detecting a falling edge of the digital signal D1 after a falling edge of the digital signal D2, the controller 140 may detect that the rotating shaft 230 is rotating in the reverse direction. In other words, when the controller 140 detects a rising edge of the digital signal D2 while the digital signal D1 is at the high level, the controller 140 may detect that the rotating shaft 230 is rotating forward. When the controller 140 detects a falling edge of the digital signal D1 while the digital signal D2 is at the low level, the controller 140 may detect that the rotating shaft 230 is rotating in the reverse direction.

FIG. 3 is a flowchart that shows an example of the operation of the rotation detection device 100 of FIG. 1 when the motor 210 is being driven. For example, FIG. 3 is realized when the controller 140 of the rotation detection device 100 executes a rotation detection program. FIG. 3 shows an example of the rotation detection method. The flow shown in FIG. 3 is started when the rotating shaft 230 is in a predetermined initial position and an indication to start rotation arrives from the driver that controls the rotation of the motor 210.

First, in step S10, the controller 140 acquires, from the driver, information that indicates the direction of rotation of the rotating shaft 230. The controller 140 may keep this acquired information indicating the direction of rotation, in a holder such as a register. Next, in step S12, the controller 140 initializes the holder that keeps the number of complete turns such as a register to a positive value (such as 3 or 5), and initializes the holder that keeps the logical values of the digital signals D1 and D2 such as a register to 0. By initializing the number of complete turns to a positive value, the number of complete turns can be treated as a positive value even when the rotating shaft 230 rotates in the reverse direction and the number of complete turns decreases.

Note that the controller 140 may initialize the holder that keeps the number of complete turns such as a register to 0. In this case, when the number of complete turns is a positive value, the controller 140 can know that this is the number of complete turns in forward rotation; likewise, when the number of complete turns is a negative value, the controller 140 can know that this is the number of complete turns in reverse rotation.

Next, in step S14, the controller 140 obtains a digital voltage value VD1 output from the AD converter 120. Next, in step S16, the controller 140 detects the rotational position of the rotating shaft 230 based on the acquired digital voltage value VD1, and reports information that indicates the detected rotational position of the rotating shaft 230 to the driver and the like.

Next, in step S18, the controller 140 obtains the logical values of the digital signals D1 and D2 that are output from the comparators 131 and 132. Note that the controller 140 keeps the logical values of the digital signals D1 and D2 acquired last time, in a holder such as a register. In the first loop of the process, the logical value 0, initialized in step S12, is used as the logical values of the digital signals D1 and D2 acquired last time. In the following description, the logical value of the digital signals D1 and D2 will be also referred to as the "logical value D1" and "logical value D2," respectively.

Next, in step S20, the controller 140 determines the direction of rotation of the rotating shaft 230, that is, whether the rotating shaft 230 is rotating forward or rotating in the reverse rotation, based on the information acquired in step S10. If the rotation of the rotating shaft 230 is forward rotation, the process moves to step S22. If the rotation of the rotating shaft 230 is reverse rotation, the process moves to step S26.

In step S22, the controller 140 determines whether the digital signals D1 and D2 have changed to the logical value 0 at the same time, based on the logical values D1 and D2 acquired in step S18 and the logical values D1 and D2 acquired last time. If the digital signals D1 and D2 have changed to the logical value 0 at the same time, a complete turn of the rotating shaft 230 is detected, so that the process moves to step S24. If the digital signals D1 and D2 have not changed to the logical value 0 at the same time, no complete turn of the rotating shaft 230 is detected, so that the process moves to step S30.

In step S24, the controller 140, having detected that the rotating shaft 230 has completed one rotation in the forward direction, increases the number of complete turns by 1, and the process moves to step S30. For example, the controller 140 reports the updated number of complete turns to the driver and the like.

In step S26, the controller 140 determines whether the digital signals D1 and D2 have changed to the logical value 1 at the same time, based on the logical values D1 and D2 acquired in step S18 and the logical values D1 and D2 acquired last time. If the digital signals D1 and D2 have changed to the logical value 1 at the same time, a complete turn of the rotating shaft 230 is detected, and the process moves to step S28. If the digital signals D1 and D2 have not changed to the logical value 1 at the same time, no complete turn of the rotating shaft 230 is detected, and the process moves to step S30.

In step S28, the controller 140, having detected that the rotating shaft 230 has completed one rotation in the reverse direction, subtracts 1 from the number of complete turns, and the process moves to step S30. For example, the controller 140 reports the updated number of rotations to the driver and the like. Note that, if the direction of rotation acquired in step S10 is kept in a holder, the controller 140 may increase the number of complete turns by 1 based on the fact that the rotating shaft 230 has completed one rotation in the reverse direction. Thus, even when the number of complete turns is increased by 1 in this manner regardless of the direction of rotation, the controller 140 can still recognize the direction of rotation and the number of complete turns.

In step S30, if the controller 140 continues the operation of detecting the rotation of the rotating shaft 230, the process moves to step S14. If the controller 140 stops the operation of detecting the rotation of the rotating shaft 230, the process shown in FIG. 3 ends. Note that the controller 140 can also detect complete turns of the rotating shaft 230, for example, by detecting a change in one of the logical values of the digital signals D1 and D2. In this case, however, different methods of complete-turn detection need to be used depending on whether or not the direction of rotation of the rotating shaft 230 is acquired from outside, which makes the control more complex. Therefore, even when the direction of rotation of the rotating shaft 230 is acquired from outside, it is still preferable to detect the rotation when the logical values of the digital signals D1 and D2 change at the same time.

As described above, according to the operation shown in FIG. 3, the controller 140 can detect the rotational position and the number of complete turns of the rotating shaft 230 not only when the motor 210 is not being driven to rotate, but also when the motor 210 is being driven to rotate. Note that the controller 140 may have holders, such as registers, for keeping the number of complete turns in forward rotation and the number of complete turns in reverse rotation separately. In this case, for example, even when the rotating shaft 230 rotates forward and then rotates in the reverse direction, the number complete turns in the forward direction and the number complete turns in the reverse direction can be kept in a distinguishable manner.

FIG. 4 is a flowchart that shows an example of the operation of the rotation detection device 100 of FIG. 1 when the motor 210 is not driven. For example, FIG. 4 is realized when the controller 140 of the rotation detection device 100 executes a rotation detection program. FIG. 4 shows an example of the rotation detection method. Parts of the process that are the same as in FIG. 3 will be assigned the same step numbers, and detailed description will be omitted.

In FIG. 4, the rotation of the motor 210 driven by the driver is stopped; the controller 140 therefore cannot acquire the direction of rotation from the driver. Consequently, step S10 in FIG. 3 is omitted in the process shown in FIG. 4, and, in steps S21 and S22, the direction of rotation is detected based on the direction of change when the logical values of the digital signals D1 and D2 change at the same time. Other parts of the process are the same as in FIG. 3.

After step S18, in step S21, the controller 140 determines whether the logical values of the digital signals D1 and D2 have changed at the same time. If the logical values of the digital signals D1 and D2 have changed at the same time, the controller 140 detects a complete turn in forward rotation or reverse rotation of the rotating shaft 230, and the process moves on to step S22. If the logical values of the digital signals D1 and D2 have not changed at the same time, the controller 140 detects no complete turn of the rotating shaft 230, and the process moves on to step S30.

In step S22, if the digital signals D1 and D2 have changed to the logical value 0 at the same time, the controller 140 detects a complete turn of the rotating shaft 230 in forward rotation, and the process moves on to step S24. If the digital signals D1 and D2 have not changed to the logical value 0 at the same time, the digital signals D1 and D2 have changed to the logical value 1 at the same time, so that the controller 140 detects a complete turn of the rotating shaft 230 in reverse rotation, and the process moves to step S28. The subsequent parts of the process are the same as in FIG. 3. As described above, according to the operation shown in FIG. 4, the controller 140 can detect the number of complete turns and the direction of rotation of the rotating shaft 230 when the logical values of the digital signals D1 and D2 change at the same time, even when the motor 210 is not being driven and the motor 210 or the gear 220 is rotated by an external force or the like.

By contrast with this, when, for example, the number of complete turns of the rotating shaft 230 is detected based on the digital signal D1 alone, a falling edge and a rising edge of the digital signal D1 appear alternately in both forward rotation and reverse rotation. Consequently, if the controller 140 receives no information that indicates the direction of rotation of the rotating shaft 230 from the driver, the controller 140 cannot determine whether the (rotating shaft 230) is rotation of the motor 210 forward rotation or reverse rotation based only on the transition edges of the digital signal D1. Here, the transition edges of the digital signals D1 and D2 include a rising edge, which is a transition from the low level to the high level, and a falling edge, which is a transition from the high level to the low level.

Figure 5:
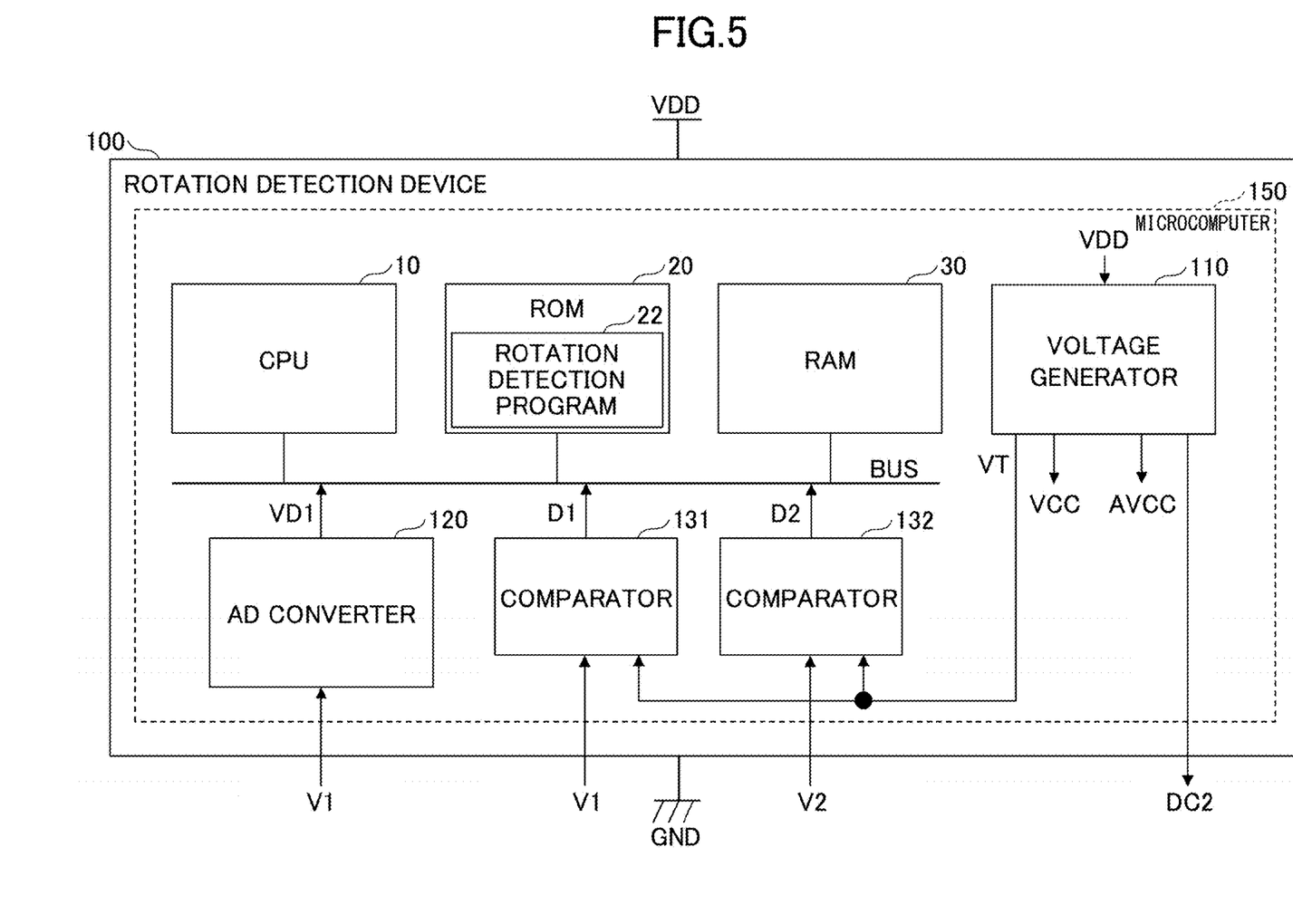
FIG. 5 is a block diagram that illustrates an example hardware structure of the rotation detection device of FIG. 1.

FIG. 5 is a block diagram that illustrates an example hardware structure of the rotation detection device 100 of FIG. 1. Elements that are the same as in FIG. 1 are assigned the same reference codes. For example, the rotation detection device 100 includes a microcomputer 150. Although this is not a limitation, the microcomputer 150 is, for example, what is referred to as a "one-chip microcomputer" (semiconductor chip).

The microcomputer 150 includes a CPU 10, a read-only memory (ROM) 20, a random access memory (RAM) 30, an AD converter 120, comparators 131 and 132, and a voltage generator 110, which are interconnected by a bus BUS. The ROM 20 stores a rotation detection program. Note that the voltage generator 110 may be located outside the microcomputer 150.

The CPU 10 controls the overall operation of the rotation detection device 100, and also implements the functions of the controller 140 of FIG. 1 by executing the rotation detection program. The CPU 10 is an example of a computer. For example, the CPU 10 acquires the digital voltage values of VD1 that are output from the AD converter 120, and the logical values of the digital signals D1 and D2 that are output from the comparators 131 and 132, via the bus BUS. Then, as shown in FIG. 3 and FIG. 4, the CPU 10 performs the operation of detecting the rotational position, the direction of rotation, and the number of complete turns of the rotating shaft 230.

As described above, according to this embodiment, the controller 140 can detect the number of complete turns and the direction of rotation of the rotating shaft 230, even when the motor 210 is not driven and the motor 210 or the gear 220 is rotated by an external force or the like.

When the motor 210 is driven, the controller 140 can detect a complete turn of the rotating shaft 230 when the transition edges of the digital signals D1 and D2 change at the same time, and update the number of complete turns. That is, regardless of whether the motor 210 is driven or not, the controller 140 can detect a complete turn of the rotating shaft 230 when the transition edges of the digital signals D1 and D2 change at the same time, and update the number of complete turns. By this means, the controller 140 can control the detection of the direction of rotation and the number of complete turns of the rotating shaft 230, in a simple way, whether the motor 210 is driven or not. The controller 140 can detect the rotational position of the rotating shaft 230 based on the digital voltage values of VD1 that are output from the AD converter 120 in accordance with the voltage V1 from the potentiometer 240.

The voltage V1 is supplied to the rotation detection device 100 through separate external terminals T11 and T12, so that it is possible to prevent the voltage V1 that is input to the AD converter 120 and the voltage V1 that is input to the comparator 131 from interfering with each other. As a result of this, it is possible to prevent the accuracy of detection by the AD converter 120 and the comparator from decreasing.

Although the present invention has been described in detail above, the present invention is by no means limited to such a specific embodiment, and various modifications and improvements can be made without departing from the spirit of the present invention.

This application is based on and claims priority to Japanese Patent Application No. 2021-094911, filed with the Japan Patent Office on Jun. 7, 2021, the entire contents of which are incorporated herein by reference.

REFERENCE SIGNS LIST

100 rotation detection device
110 voltage generator
120 analog-to-digital converter (ADC)
131, 132 comparator (CMP)
140 controller
150 microcomputer
200 actuator
210 motor
220 gear
230 rotating shaft
240 potentiometer
1000 system
AVCC power supply voltage
D1, D2 digital signal
DC2 DC voltage
R1, R2 resistance
T11, T12, T13 external terminal
V1, V2 voltage
VCC power supply voltage
VD1 digital voltage value
VT threshold voltage

The invention claimed is:

1. A rotation detection device comprising:
a first comparator configured to generate a first digital signal that indicates a magnitude relationship between a first voltage, which is output from a potentiometer in accordance with an amount of rotation of a rotating body, and a threshold voltage;
a second comparator configured to generate a second digital signal that indicates a magnitude relationship between a second voltage, which is obtained by dividing the first voltage, and the threshold voltage; and
a controller configured to detect a direction of rotation and a number of complete turns of the rotating body based on transition edges of the first digital signal and transition edges of the second digital signal.

2. The rotation detection device according to claim 1, wherein the controller detects that the rotating body has completed one rotation every time the controller detects a falling edge of the first digital signal and a falling edge of the second digital signal at a same time, or every time the controller detects a rising edge of the first digital signal and a rising edge of the second digital signal at the same time.

3. The rotation detection device according to claim 1, wherein, regardless of whether or not the controller identifies the direction of rotation of the rotating body, the controller detects that the rotating body has completed one rotation in a first direction of rotation every time the controller detects a falling edge of the first digital signal and a falling edge of the second digital signal at a same time, and
wherein the controller detects that the rotating body has completed one rotation in a second direction of rotation, which is opposite to the first direction of rotation, every time the controller detects a rising edge of the first digital signal and a rising edge of the second digital signal at the same time.

4. The rotation detection device according to claim 1, further comprising an analog-to-digital converter configured to convert the first voltage into digital values,
wherein the controller detects the amount of rotation of the rotating body based on the digital values output from the analog-to-digital converter.

5. The rotation detection device according to claim 4, further comprising a semiconductor chip including a first terminal and a second terminal that are configured to receive the first voltage, the analog-to-digital converter, the first comparator, the second comparator, and the controller,
wherein the first terminal is connected to an input of the analog-to-digital converter, and
wherein the second terminal is connected to an input of the first comparator.

6. A rotation detection method comprising:
generating, in a first comparator, a first digital signal that indicates a magnitude relationship between a first voltage, which is output from a potentiometer in accordance with an amount of rotation of a rotating body, and a threshold voltage;
generating, in a second comparator, a second digital signal that indicates a magnitude relationship between a second voltage, which is obtained by dividing the first voltage, and the threshold voltage; and
detecting, in a controller, a direction of rotation and a number of complete turns of the rotating body, based on transition edges of the first digital signal and transition edges of the second digital signal.

7. A non-transitory computer-readable recording medium storing a rotation detection program that, when executed on a computer, causes the computer to:
acquire a first digital signal, generated by a first comparator and indicating a magnitude relationship between a first voltage, which is output from a potentiometer in accordance with an amount of rotation of a rotating body, and a threshold voltage;
acquire a second digital signal, generated by a second comparator and indicating a magnitude relationship between a second voltage, which is obtained by dividing the first voltage, and the threshold voltage; and
detect a direction of rotation and a number of complete turns of the rotating body based on transition edges of the first digital signal and transition edges of the second digital signal.

* * * * *